United States Patent
Otamendi et al.

(10) Patent No.: US 8,855,054 B2
(45) Date of Patent: Oct. 7, 2014

(54) TWO-WAY RADIO BASED UNIFIED COMMUNICATIONS SYSTEM

(75) Inventors: Nicolas Otamendi, Kanata (CA); Cameron Brian Sorlie, Ottawa (CA); Mark T. Dabrowski, Manchester, CT (US); Benjamin J. Willis, Lawrenceville, NJ (US); Robert F. McCook, III, Holmdel, NJ (US); Charles Xie, Nepean (CA)

(73) Assignee: Teldio Corporation (CA)

( * ) Notice: Subject to any disclaimer, the term of this patent is extended or adjusted under 35 U.S.C. 154(b) by 167 days.

(21) Appl. No.: 13/388,080

(22) PCT Filed: Jul. 6, 2010

(86) PCT No.: PCT/CA2010/001059
§ 371 (c)(1),
(2), (4) Date: May 24, 2012

(87) PCT Pub. No.: WO2011/003192
PCT Pub. Date: Jan. 13, 2011

(65) Prior Publication Data
US 2012/0230254 A1 Sep. 13, 2012

Related U.S. Application Data

(60) Provisional application No. 61/223,104, filed on Jul. 6, 2009.

(51) Int. Cl.
*H04W 4/00* (2009.01)
*H04L 12/66* (2006.01)
*H04W 76/02* (2009.01)
*H04L 29/06* (2006.01)
*H04W 4/20* (2009.01)
*H04W 4/10* (2009.01)
*H04W 88/16* (2009.01)

(52) U.S. Cl.
CPC .............. *H04L 12/66* (2013.01); *H04W 76/02* (2013.01); *H04L 65/608* (2013.01); *H04L 65/4061* (2013.01); *H04W 4/20* (2013.01); *H04L 65/1006* (2013.01); *H04W 88/16* (2013.01); *H04W 4/10* (2013.01)
USPC .......................... 370/328; 370/282; 370/259

(58) Field of Classification Search
USPC .............. 370/328, 401, 312; 455/452.2, 518, 455/466; 709/203
See application file for complete search history.

(56) References Cited

U.S. PATENT DOCUMENTS

| | | |
|---|---|---|
| 2002/0085516 A1 | 7/2002 | Bridgelall |
| 2006/0105792 A1* | 5/2006 | Armbruster et al. .......... 455/517 |
| 2007/0105578 A1* | 5/2007 | Shaffer et al. ................. 455/518 |
| 2008/0123670 A1* | 5/2008 | Mundra et al. ................ 370/401 |
| 2008/0176586 A1* | 7/2008 | George et al. ................. 455/466 |
| 2009/0075669 A1* | 3/2009 | Franceschini et al. ..... 455/452.2 |

* cited by examiner

*Primary Examiner* — Andrew Lai
*Assistant Examiner* — Jamaal Henson
(74) *Attorney, Agent, or Firm* — Laubscher & Laubscher, P.C.

(57) ABSTRACT

A system for establishing two-way calls between a radio and a phone system is provided. The system comprises at least one control station for exchanging messages with the radio, at least one interconnect control station, or pair of interconnect control stations, for communicating audio signals to and from the radio over a communication channel comprising respective transmit and receive frequencies, and a gateway for exchanging messages with the phone system, the control station and the at least one interconnect control station, or pair of interconnect control stations, causing the radio to switch to the communication channel whereby audio is transmitted from the phone system to the radio over the transmit frequency and audio as well as DTMF is transmitted from the radio to the phone system for activating special features of the phone system.

18 Claims, 8 Drawing Sheets

TWO-WAY RADIO BASED UNIFIED COMMUNICATIONS SYSTEM

FIELD

The present application relates to two-way land-based radio systems and, more particularly, to an integrated digital two-way radio platform and IP PBX unified communication system.

BACKGROUND

Server-based call processing and call control is well known for the provision of packet-switched and Internet-based telephony and other call-oriented services. Conventional systems utilize call interfaces which are capable of managing packet-based or IP-based voice and data communications over the Internet, local area networks and wireless networks. These systems typically enable IP telephony through implementation of a call processing server having call processing hardware and software operative for call initiation and management of communications between endpoints using well known networking protocols, such as Transmission Control Protocol/Internet Protocol (TCP/IP), Real-time Transport Protocol (RTP), Session Description Protocol (SDP) and Session Initiation Protocol (SIP), etc.

As the need for network inter-working becomes more widespread, especially with the deployment of IP networks, there is an increasing need for service providers to interconnect with other networks that are using different signaling protocols. Thus, systems have been developed for implementing wireless telecommunication in packet-based networks. Examples of such systems are set forth in U.S. Pat. Nos. 7,200,139 and 6,671,364 and United States Patent Application Publication Nos. US 2008/0002673 and US 2006/0019655.

Half-duplex two-way radio systems are also well known, and offer certain advantages over conventional full-duplex wired and wireless communication systems. For example, two-way half-duplex radio systems provide immediate connection (i.e. the user merely pushes a button to talk, and is not required to dial a number and wait for a connection), automatic broadcasting to a group of radio endpoints on a common frequency (i.e. no need to establish a conference call), continued operation during natural disasters, snowstorms, etc., and are usually built to military standards capable of withstanding harsh operating environments and rough handling.

However, half-duplex radio systems also have certain limitations over conventional full-duplex communication systems. For example, in half-duplex communication mode (often referred to as push-to-talk (PTT)) a button is pushed when transmitting/talking and the same button is released when receiving/listening. That is, after the user of such a two-way radio depresses the "talk" button, other radio users tuned to the same frequency are prevented from transmitting/talking until the user releases the button. Thus, in contrast with full-duplex communication mode devices, a half-duplex radio cannot transmit and receive at the same time.

Accordingly, there exists a need to extend Internet-based telephony and other call-oriented services to half-duplex radio systems using existing network communication protocols, for integration with existing IP PBX networks as well as next-generation digital communication systems.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

A first aspect of the specification provides a system for establishing two-way calls between a radio and a phone system. The system comprises: at least one control station for exchanging messages with the radio; at least one interconnect control station, for communicating audio signals to and from the radio over a communication channel comprising respective transmit and receive frequencies; and a gateway for exchanging messages with the phone system, the control station and the at least one interconnect station or pair of interconnect control stations causing the radio to switch to the communication channel whereby audio is transmitted from the phone system to the radio over the transmit frequency and further audio as well as control signals are transmitted from the radio to the phone system for activating special features of the phone system.

The special features can be selected from the group comprising call transfer, conference, hot swap, lost call notification, voice mail notification, call routing according to GPS position and activating alarms/lights or devices.

The transmit and receive frequencies can be one of a common frequency and different frequencies The at least one interconnect control station can be enabled to exchange messages with the radio.

The at least one interconnect control station can be enabled to exchange messages with at least one other interconnect control stations. The at least one interconnect control station and the at least one other interconnect control station can form a pair of interconnect control stations. The pair of interconnect control stations can be enabled to communicate the audio signals to and from the radio over the communication channel. The communication channel can comprise the respective transmit and receive frequencies, the respective transmit and receive frequencies being different frequencies. The pair of interconnect control stations can be together enabled to simultaneously exchange messages with the radio.

The gateway can be enabled to translate call control signals between a DMR (digital mobile radio) protocol and packet based network protocols. The packet based network protocols can comprise at least one of Session Initiation Protocol (SIP), Real-time Transport Protocol (RTP) and Voice over Internet Protocol.

The phone system can be enabled for automated handling of radio discipline in the two-way call.

The radio can comprise an option board enabled to control the radio and further enabled to provide enhanced call control.

The communication channel can comprise custom signaling protocols for addressing RF communication reliability issues in using two-way radios for extended conversations with telephones. The option board can be further enabled to inject synthesized tones into an audio transmission from the radio. The option board can be reprogrammable over the air via the control station under control of the gateway.

The at least one interconnect control station can be further enabled to switch to transmit and receive frequencies of a group of radios. The gateway can be further enabled to establish a many-to-many call between the group of radios and a phone system. The gateway can be further enabled to provide audio notifications about key call set-up events to all call parties.

The at least one control station and the at least one interconnect control station can be one of a common control station or different control stations.

The control signals can comprise DTMF (dual-tone multifrequency).

Figure 1:
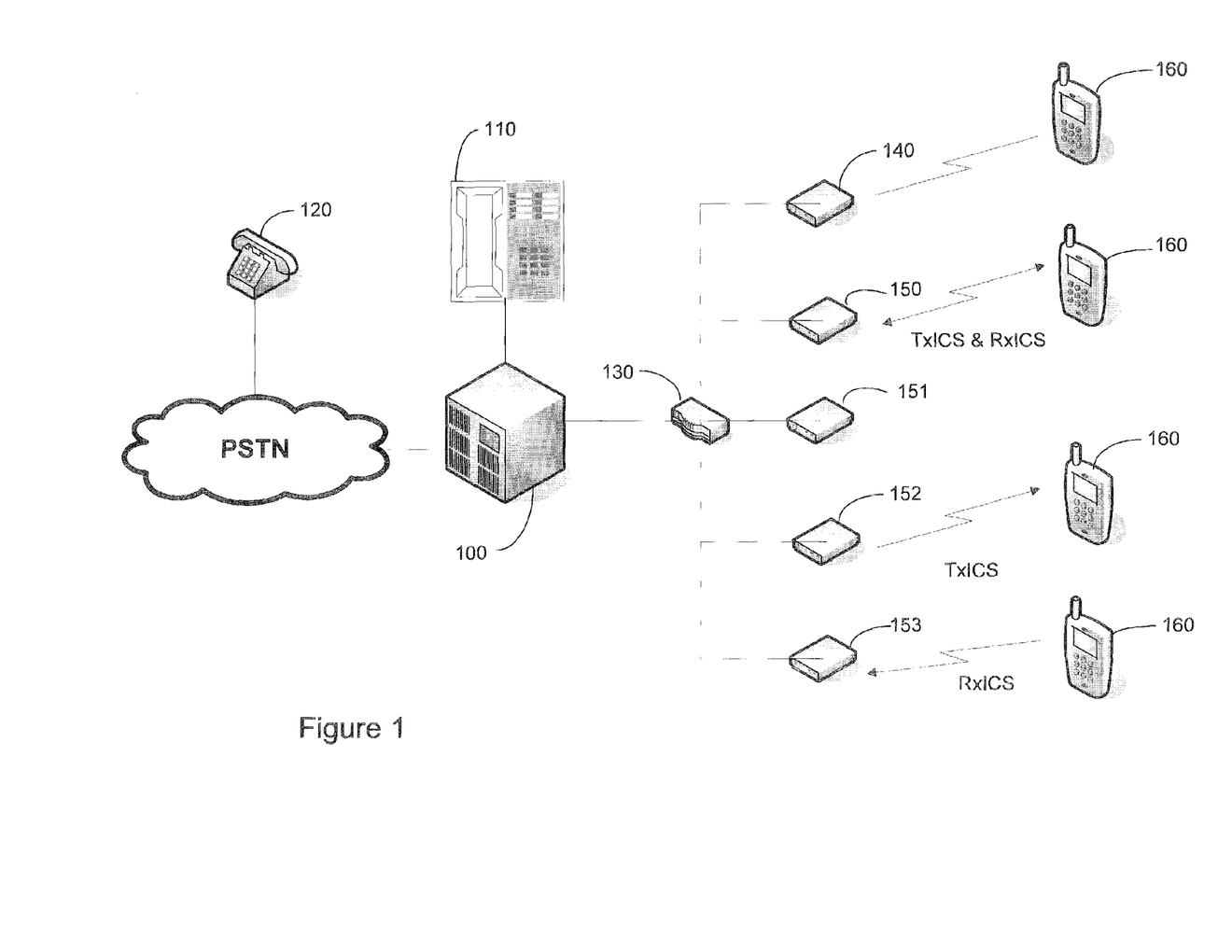
FIG. 1 shows, in block diagram form, an integrated digital two-way radio platform and IP PBX unified communication system, according to an exemplary embodiment.

Referring now to FIG. 1, an integrated digital two-way radio platform and IP PBX unified communication system is shown according to an exemplary embodiment, comprising a PBX 100, such as a Mitel® 3300 IP Communications Platform (ICP) for effecting voice communications between local IP phones, such as phone 110, and remote phones, such as phone 120, over the Public Switched Telephone Network (PSTN), a gateway 130 connected to the PBX 100, a control station 140 and a plurality of interconnect control stations 150-153 for radio frequency (RF) communication with a plurality of two-way radios 160.

The gateway 130 communicates with the PBX 100 over one or more trunks using SIP, or other standard protocol, and with the control stations 140, 150-153 via a serial interface, such as USB and with the control stations 150-153 via audio connections, such as an analog line input and output. In one exemplary embodiment each radio 160 incorporates a MotoTRBO™ option board manufactured by Motorola or by a third party to Motorola specifications. Option boards within each radio 160 communicate with the main circuitry of the radio using Extended Command and Management Protocol (XCMP) control and data messages encapsulated within XCMP Network Layer (XNL) packets over an internal serial interface, for controlling the radio in accordance with the functionality set forth in greater detail below. Interconnect control stations 150-153 additionally include analog audio in/out lines connected to the gateway 130. Additional details of the XCMP protocol may be found in publicly available documents, such as published international patent application no. PCT/US2007/065038, published on Jan. 10, 2008 under publication no. WO/2008/005602 (Motorola, Inc.) and MOTOTRBO™ Application Development Kit Overview Version 01.02, published Apr. 15, 2008 by Motorola, Inc.

In some implementations, control station 140 can be interconnected with other control station 150-153.

In yet further implementations, at least one of control stations 140, 150-153 can comprise an option board.

In yet further implementations control stations 140, 150-153 communicate with gateway 130 using Extended Command and Management Protocol (XCMP) control and data messages encapsulated within XCMP Network Layer (XNL) packets. In implementations where control stations 140, 150-153 comprise an option board, the option board can enable control stations 140, 150-153 to communicate with gateway 130 using Extended Command and Management Protocol (XCMP) control and data messages encapsulated within XCMP Network Layer (XNL) packets. In non-limiting exemplary implementations, the option board can comprise a MotoTRBO™ option board manufactured by Motorola or the like.

The control station 140 provides a signaling path between the gateway 100 and the radios 160, while the interconnect control stations 150-153 provide RF audio paths between the gateway 100 and the radios 160. As discussed in greater detail below, a plurality of simultaneous phone calls can be established between the PBX 100 and radios 160 in proportion to the number of interconnect control stations 150-153.

In operation, as discussed in greater detail below with reference to FIGS. 4-7, each radio 160 when not tuned to any frequencies of the interconnect control stations 150-153 scans between a frequency that is used for normal two-way direct radio-to-radio broadcasts and the frequency of the control station 140. In the event of a call from a phone 120, 110, etc., the PBX 100 sends a SIP INVITE message to the gateway 130 which, in response and in accordance with its policies, searches for and reserves an available communication channel and, sends via control station 140 an incoming call signaling message (INCALL), embedded within an XCMP message. The XCMP message incorporates a destination ID for identifying one or a group of radios 160. Each radio 160 scanning the frequency of the control station 140 reads this ID and checks for a match with its own ID to determine whether or not to forward the message to the internal option board of the radio 160 for action responsive to the embedded INCALL signaling message. This INCALL message includes an identification (Channel ID) of the communication channel reserved by the gateway 130 for the call to take place on. Each channel is implemented using one interconnect control station 150-153 or using a pair of interconnect control stations 150-153. In case of one interconnect control station, the interconnect control stations 150-153 transmit audio and data messages to, and receives audio and data messages from the radio 160 on the same dedicated frequency (TxICS & RxICS). In case of a pair of interconnect control stations 150-153, one interconnect control station 150-153 transmits audio and data messages to the radio 160 on a first dedicated frequency (TxICS) while the other interconnect control station 150-153 receives audio and data messages from the radio 160 on a second dedicated frequency (RxICS). Upon receipt of the incoming call message, the option board of the radio 160 causes the radio to change to the assigned communication channel (i.e. the radio is tuned to receive on the transmit frequency and broadcast on the receive frequency, the transmit and receive frequencies being the same or different), and the call may proceed.

In the event that the user at radio 160 wishes to transmit while the remote phone 120, 110, etc. is transmitting, and the communication channel is comprised of a pair of interconnect stations 150-153, the user presses the PTT button on the radio such that audio in transmitted over the interconnect control station's receive channel (RxICS). Accordingly, unlike with conventional half-duplex radio systems, the radio user of the exemplary embodiment is able to 'interrupt' a phone user who is talking. Also, unlike conventional half-duplex radio systems, the radio user is able to send DTMF signals over the receive channel (RxICS) in order to activate special features of the PBX 100, such as call transfer, conference, etc.

Figure 2:
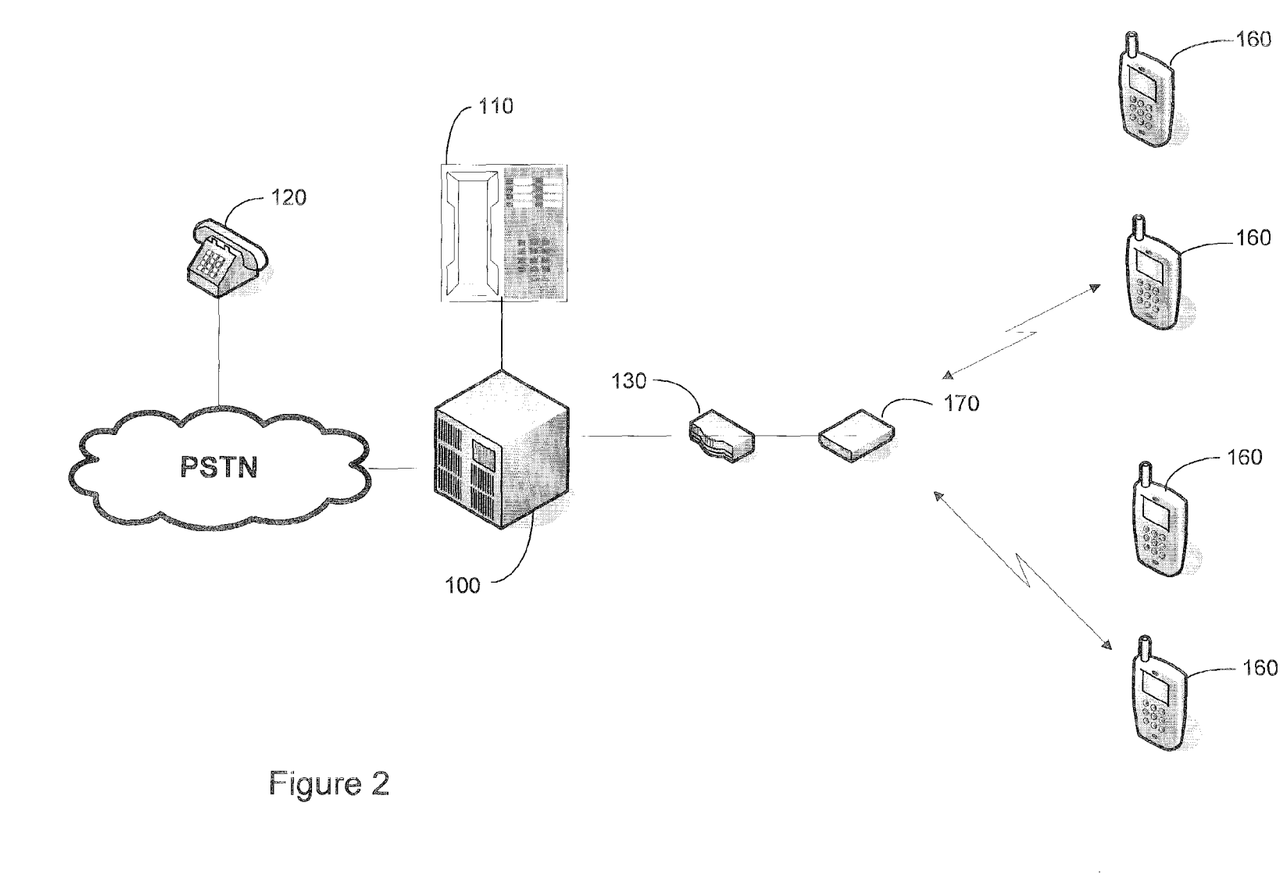
FIG. 2 shows, in block diagram form, an integrated digital two-way radio platform and IP PBX unified communication system, according to an alternate exemplary embodiment.

Referring now to FIG. 2, an integrated digital two-way radio platform and IP PBX unified communication system is shown according to an alternate exemplary embodiment, comprising a PBX 100, such as a Mitel®3300 IP Communications Platform (ICP) for effecting voice communications between local IP phones, such as phone 110, and remote phones, such as phone 120, over the Public Switched Telephone Network (PSTN), a gateway 130 connected to the PBX 100, and a single control station 170 for radio frequency (RF) communication with a plurality of two-way radios 160.

The gateway 130 communicates with the PBX 100 over one or more trunks using SIP, or other standard protocol, and with the control station 170 via a serial interface, such as USB and with the control station 170 via audio connections, such as an analog line input and output. In one exemplary each radio 160 incorporates an option board, as described above.

In this alternate exemplary embodiment the control station 170 provides both a signaling path between the gateway 100 and the radios 160, and an RF audio path between the gateway 100 and the radios 160. A single simultaneous phone call can be established between the PBX 100 and radios 160.

In operation, as discussed in greater detail below with reference to FIGS. 4-7, each radio 160 when not tuned to the frequency of the interconnect control station 170 scans between a frequency that is used for normal two-way direct radio-to-radio broadcasts and the frequency of the control station 170. In the event of a call from a phone 120, 110, etc., the PBX 100 sends a SIP INVITE message to the gateway 130 which, in response and in accordance with its policies, reserves the available communication channel and, sends via control station 170 an incoming call signaling message (INCALL), embedded within an XCMP message. The XCMP message incorporates a destination ID for identifying one or a group of radios 160. Each radio 160 scanning the frequency of the control station 170 reads this ID and checks for a match with its own ID to determine whether or not to forward the message to the internal option board of the radio 160 for action responsive to the embedded INCALL signaling message. This INCALL message includes an identification (Channel ID) of the communication channel reserved by the gateway 130 for the call to take place on. The channel is implemented using control station 170. Upon receipt of the incoming call message, the option board of the radio 160 causes the radio to stay on the assigned communication channel, and the call may proceed.

Figure 3:
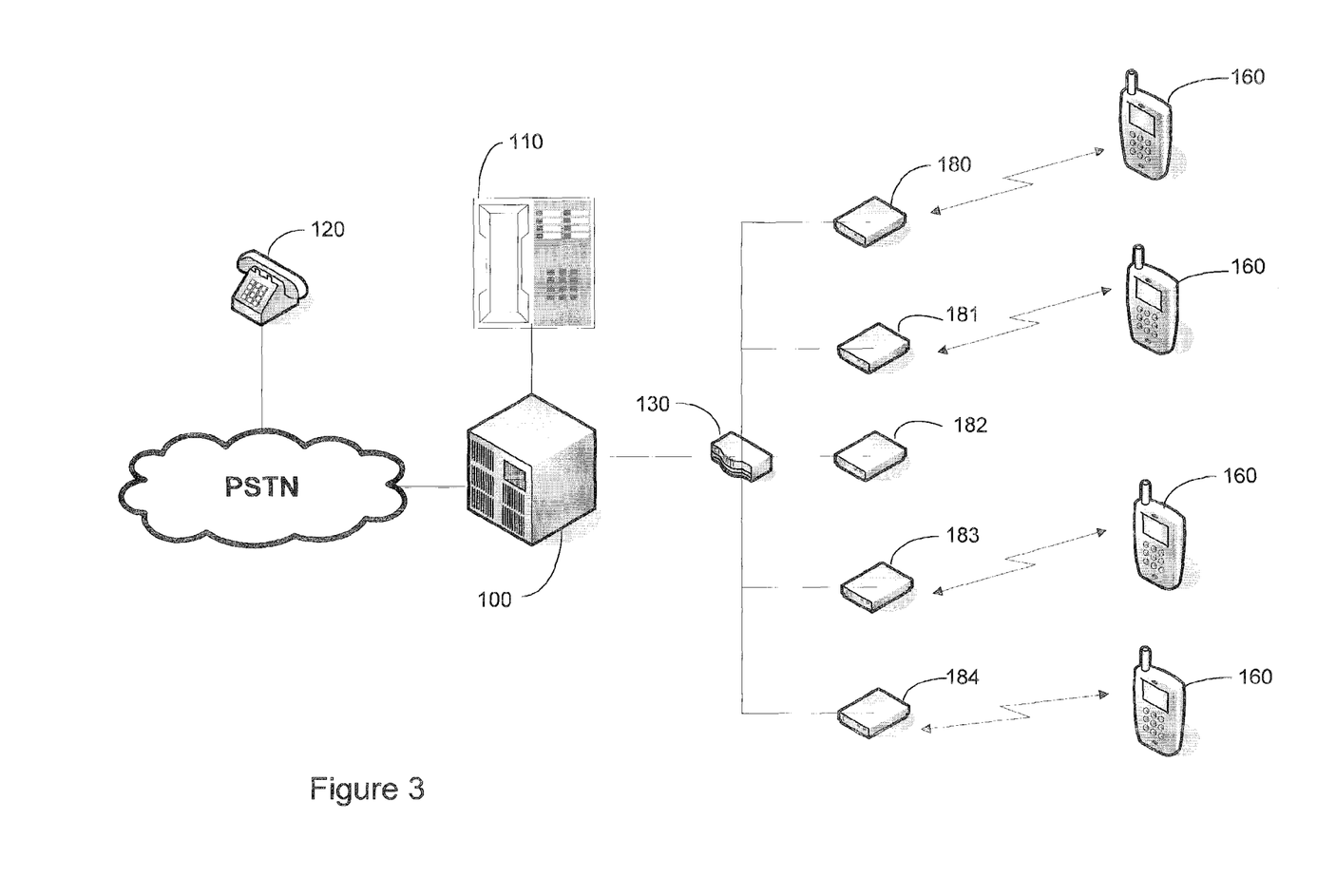
FIG. 3 shows, in block diagram form, an integrated digital two-way radio platform and IP PBX unified communication system, according to another alternate exemplary embodiment.

Referring now to FIG. 3, an integrated digital two-way radio platform and IP PBX unified communication system is shown according to another alternate exemplary embodiment, comprising a PBX 100, such as a Mitel® 3300 IP Communications Platform (ICP) for effecting voice communications between local IP phones, such as phone 110, and remote phones, such as phone 120, over the Public Switched Telephone Network (PSTN), a gateway 130 connected to the PBX 100, and a plurality of control stations 180-184 for radio frequency (RF) communication with a plurality of two-way radios 160.

The gateway 130 communicates with the PBX 100 over one or more trunks using SIP, or other standard protocol, and with the control stations 180-184 via a serial interface, such as USB and with the control stations 180-184 via audio connections, such as an analog line input and output. In one exemplary embodiment each radio 160 incorporates an option board, as has been described above.

In this alternate exemplary embodiment each of the control stations 180-184 provides both a signaling path between the gateway 100 and the radios 160, and an RF audio path between the gateway 100 and the radios 160. A plurality of simultaneous phone calls can be established between the PBX 100 and radios 160 in proportion to the number of control stations 180-184.

In operation, as discussed in greater detail below with reference to FIGS. 4-7, in the event of a call from a phone 120, 110, etc., the PBX 100 sends a SIP INVITE message to the gateway 130 which, in response and in accordance with its policies, reserves an available communication channel and sends via the reserved control station 180-184 an incoming call signaling message (INCALL), embedded within an XCMP message. The XCMP message incorporates a destination ID for identifying one or a group of radios 160. Each radio 160 resting on the frequency of the control station 180-184 reads this ID and checks for a match with its own ID to determine whether or not to forward the message to the internal option board of the radio 160 for action responsive to the embedded INCALL signaling message. This INCALL message includes an identification (Radio ID) of the communication channel reserved by the gateway 130 for the call to take place on. The channel is implemented using the reserved control station 180-184. Upon receipt of the incoming call message, the option board of the radio 160 causes the radio to communicate with the assigned communication channel for the purpose of connecting the call, and the call may proceed. During the call, the gateway 130 causes the radio 160 to stay on the assigned communication channel for the purpose of exclusively communicating with the radio 160.

During a call, radio 160 is enables to transmit synthesized audio tones within its audio transmissions, for example to send DTMF digits inband in order to activate special features of the PBX 100, including but not limited to call transfer, conference, or the like. In one exemplary embodiment, the option board of radio 160 causes the rerouting of the PCM-encoded audio data captured at the radio's microphone from the main circuitry of radio 160 to the option board. To continue the non-limiting example, in response to numeric key presses by the radio user on the keypad of radio 160, the option board generates DTMF tone samples and causes the display of feedback about the DTMF transmission to the user. The option board mixes the synthesized tone samples together with the microphone audio samples, and causes the mixed audio stream to be routed back to the main circuitry of radio 160 for transmission to the reserved control station 180-184 over which the call is taking place. The control station 180-184 in turn passes the audio stream to gateway 130 where the synthesized tones are detected in one exemplary embodiment. To continue the foregoing non-limiting example, DTMF tones are detected in the exemplary embodiment at gateway 130 and converted to appropriate SIP DTMF signaling to PBX 100.

Figure 4:
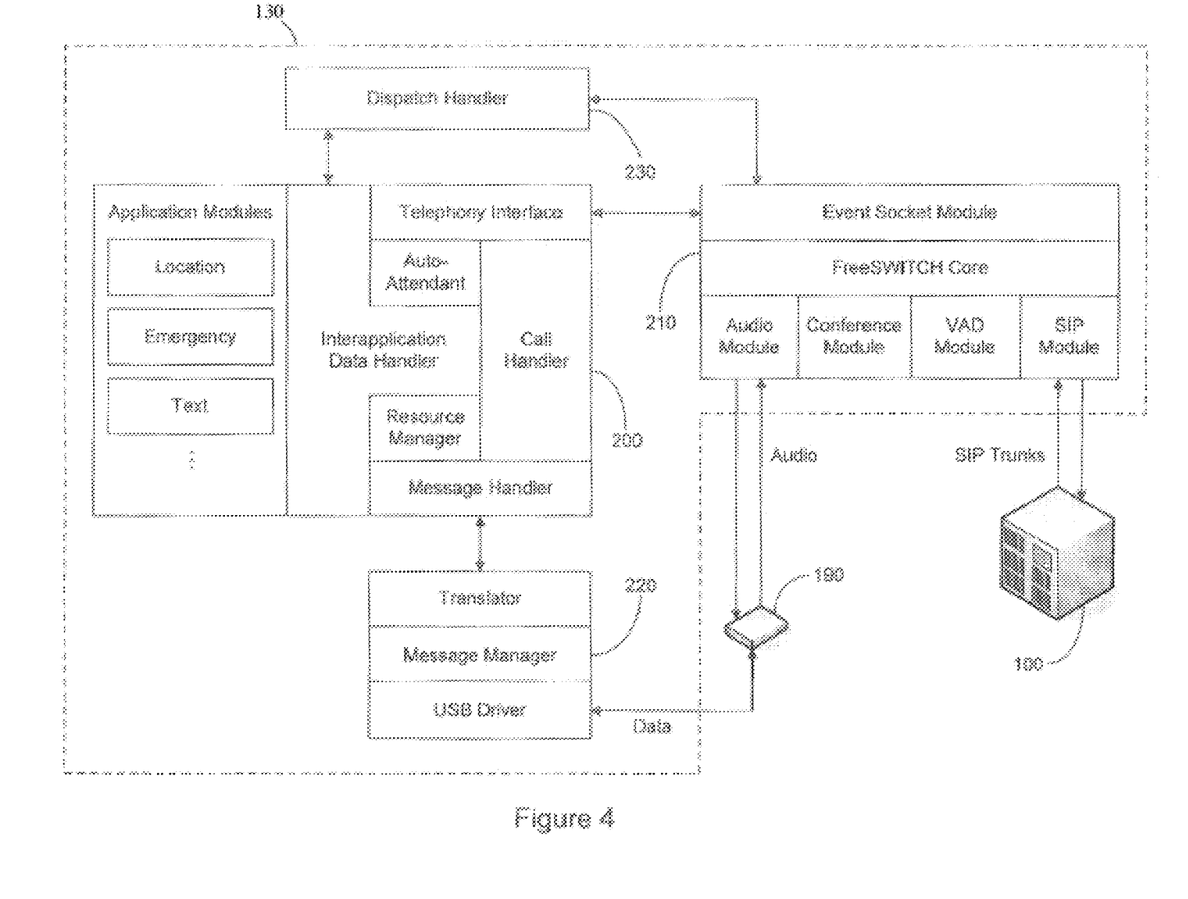
FIG. 4 shows, in block diagram form, components of an exemplary gateway for implementing server-side functionality of the systems shown in FIGS. 1-3.

Turning briefly to FIG. 4, components of the gateway 130 are shown. The gateway 130 includes a server 200 with socket connections to a telephony platform 210 and a messaging system 220. The gateway 130 can also include an optional dispatch handler 230 which has a socket connection to the telephony platform 210 and a communication connection with the server 200. According to an exemplary embodiment, telephony platform 210 is an open source telephony platform such as FreeSWITCH. The FreeSWITCH telephony platform 210 of the exemplary embodiment includes an Event Socket Module, which is a socket interface for external applications to monitor and control the operation of the FreeSWITCH platform by executing FreeSWITCH API functions. The Event Socket Module communicates with a FreeSWITCH Core which, in turn, communicates with a SIP Module, an Audio Module, and a Conference Module. The SIP Module is logically connected via one or more SIP Trunks to the PBX 100 and is responsible for handling the SIP protocol details necessary for establishing, maintaining and closing communication paths between the gateway 130 and the PBX 100. The Audio Module converts digital audio packets from the SIP Module via the FreeSWITCH Core into analog audio which is output to an interconnect control station 190, wherein interconnect control station 190 can comprise any suitable one of control stations 150-153, 170, or 180-184, and converts analog audio input from the interconnect control station 190 into appropriate digital audio packets which are then sent via the FreeSWITCH Core to the SIP Module. The Conference Module provides multi-user conferencing features. In addition, the FreeSWITCH telephony platform of the exemplary embodiment is provided with a Voice Activity Detection (VAD) Module, which is used to drive automatic PTT actuation on the interconnect control station 190 on behalf of the phone 110, 120, etc., and to detect, by means of the absence of voice activity from the radio 160 for a period of time, when communication with the radio 160 has been lost abnormally.

The messaging system 220 includes a Translator, Message Handler and USB Driver, any one of which can be modified for compatibility with a type of control station 190 other than as used in the exemplary embodiments (e.g. stations manufactured by vendors other than Motorola, which do not use XCMP/XNL for communication).

For ease of illustration, the gateway 130 is shown in FIG. 4 connected to a single interconnect control station 190. However, it will be appreciated that in normal use gateway 130 will normally be connected to a control station 140 and multiple interconnect control stations 150-153, as illustrated in FIG. 1, and/or to other configurations of control stations as illustrated in FIGS. 2 and 3.

As discussed in greater detail below, server 200 includes the core functionality and logic for tracking which communication channels are free, associating phone extensions with specific radios (e.g. matching an incoming call to a particular phone extension with a radio ID, so that when the extension is called by the PBX 100, the call is mapped to the radio with ID).

The server 200 includes a Telephony Interface for communications with the telephony platform 210 via a socket connection using an appropriate protocol (e.g. FreeSWITCH protocol in the exemplary embodiment) and a Message Handler for communications with control station 190 and radios 160 via the messaging system 220 using a proprietary RBX Messaging Protocol (RBXMP).

As discussed in greater detail below, dispatch handler 230 can include the core functionality and logic for associating an extension with a specific group of radios (e.g. matching an incoming call to a particular phone extension with a group ID and frequency, so that when the extension is called by the PBX 100, the call is mapped to the group with ID operating on the frequency).

A call coming in from the PBX 100 into the telephony platform 210 is accepted into the server 200 via the Telephony Interface, whereupon the server 200 takes control of the call. Upon taking control, the server 200 Auto-Attendant uses the Resource Manager first to verify that the dialed extension maps to a radio 160 known to the system and second to reserve a communication channel for the call to take place on.

If the dialed extension is invalid or there are no free channels the Auto-Attendant disposes of the call itself. In the event the disposition is due to a lack of channels, the Auto-Attendant may, for example, if configured to do so, redirect the caller to a voicemail system. A call for which a communication channel is successfully reserved is then passed to the Call Handler of server 200 for management. Upon taking over management of the call the Call Handler registers with the Message Handler to receive all RBXMP messages which are derived by the messaging system 220 from RBXAP messages broadcast over the reserved communication channel by the particular radio 160 addressed in the call. The Call Handler then waits for a predetermined time period for the called radio 160 to signal its presence on the communication channel, and waits for another period of time for the radio 160 to answer the call. If neither event happens within the allotted time, the Call Handler disposes of the call by instructing the telephony platform 210 via the Telephony Interface to hang up.

A request by a radio 160 to make an outgoing call is accepted into the server 200 via the Message Handler and is passed on to the Auto-Attendant. As in the case of an incoming call, the Auto-Attendant uses the Resource Manager first to verify that the dialed number is valid and allowed for the user of radio 160 and second to reserve a communication channel for the call to take place on. If the dialed number is invalid or there are no free channels, the Auto-Attendant signals the radio 160 via a suitably determined control station 190 that its request is denied. If the call is to proceed, the Auto-Attendant signals the radio 160 via a suitably determined control station 190 to switch as necessary to the assigned communication channel and the Auto-Attendant then passes the call on to the Call Handler for set up and management. As in the case of an incoming call, upon taking over management of the call, the Call Handler registers with the Message Handler to receive all RBXMP messages which are derived by the messaging system 220 from RBXAP messages broadcast over the reserved communication channel by the particular radio 160 making the call. The Call Handler then instructs the telephony platform 210 via the Telephony Interface, to initiate the outgoing call through PBX 100. The Call Handler apprises the radio 160 via the Message Handler, of when the called party is being rung, and when the called party answers.

When the call is answered, either by the radio 160 in an incoming call or by the called party in an outgoing call, the Call Handler instructs the telephony platform 210 via the Telephony Interface to connect audio pathways and begin passing audio transmissions back and forth between the Audio Module and the SIP Module of the telephony platform 210. The Call Handler also instructs the telephony platform 210 to activate its VAD Module on the audio pathway of this call connection, from which module the Call Handler receives information about the 'ebb and flow' of conversation with which the Call Handler applies radio discipline automatically on behalf of the external SIP side of the call. Specifically, the Call Handler uses the VAD data to activate and deactivate the push-to-talk function on the transmitting control station 190 based on when the SIP side party speaks and stops speaking, respectively.

The Call Handler also utilizes information about both call parties from the VAD Module of the telephony platform 210 in conjunction with a passive system of pings or other periodic signaling actions between the radio 160 and the server 200 to detect when the connection with the radio 160 has abnormally ended. Because of the fundamental unreliability of over-the-air RF communication, it is the absence of voice activity and pings or similar signaling actions together which constitute the indication of a dropped connection. The pings or similar signaling actions take the place of conversation when one party to the call is simply silent for a predetermined period of time. The inaudible pings or similar actions are in fact signaling messages conditionally and periodically sent by both the radio 160 and the server 200 (generated in the latter case by the Call Handler) to the other side of the air interface. The condition is that the radio 160 or the server 200, respectively, has not transmitted any audio for a configured period of time, or alternately that the radio 160 and the server 200 together have not transmitted any audio for a configured period of time. The periodicity is that the ping or similar action is reissued if the party has or parties have remained silent for another period of time equal to the first. On determination of a lost connection, from the absence of audio transmission and pings or similar action from the radio 160, the Call Handler disposes of the call.

When the call is normally or abnormally terminated the Call Handler instructs the telephony platform 210 via the Telephony interface to end the call by hanging up. The Call Handler cooperates with the Resource Manager to restore the system and in particular the communication channel used for the call to a state in which it may be used again.

The server 200 incorporates an Interapplication Data Handler to provide access for supplementary application modules to the call handling and resource management logic of the server 200 as well as access to the communication interfaces to the telephony platform 210 and the messaging system 220.

Messages generated by the gateway 130 include incoming Call (INCALL), Outgoing Call Reply (OUTCALL_REPLY), Phone Ringing (PHONE_RINGING) and Phone Answer (PHONE_ANSWER).

According to the exemplary embodiments, but in no way limiting variations of the exemplary embodiments, the message structure of the server messages is as set forth in the tables below, and can comprise custom signaling protocols for addressing RF communication reliability issues in using two-way radios for extended conversations with telephones:

TABLE A

Incoming Call

| Message | INCALL |
| --- | --- |
| Opcode | 0x0010 |
| Direction | Messaging System → Remote Radio |
| Channel | Control Channel |

| Offset | Field | Size | Description |
| --- | --- | --- | --- |
| 0 | Opcode | 2 | Value = 0x0010 |
| 2 | Channel ID | 2 | Specifies the channel number |
| 4 | Caller Number Size | 1 | Size of the Caller Number |
| 5 | Caller Number | — | Caller Number |
|   | Caller ID Size | 1 | Size of the Caller ID information |
|   | Caller ID | — | Information about the caller (First, Last Name) |

TABLE B

Outgoing Call Reply

| Message | OUTCALL_REPLY |
| --- | --- |
| Opcode | 0x0016 |
| Direction | Messaging System → Remote Radio |
| Channel | Control Channel |

TABLE B-continued

Outgoing Call Reply

| Offset | Field | Size | Description |
| --- | --- | --- | --- |
| 0 | Opcode | 2 | Value = 0x0016 |
| 2 | Result | 1 | Specifies the result of the outgoing call |
| 3 | Channel ID | 2 | Specifies the channel ID |

The Outgoing Call Reply also includes a result field, as follows:

TABLE C

Result

| Result | Value | Possible Causes |
| --- | --- | --- |
| Success | 0X00 | Cannel available |
| No Resources | 0x01 | No channels available |
| Bad Number | 0x02 | Number is invalid or does not exist |

TABLE D

Phone Ringing

| Message | PHONE_RINGING |
| --- | --- |
| Opcode | 0x0040 |
| Direction | Messaging System → Remote Radio |
| Channel | Interconnect Channel |

| Offset | Field | Size | Description |
| --- | --- | --- | --- |
| 0 | Opcode | 2 | Value = 0x0040 |

TABLE E

Phone Answer

| Message | PHONE_ANSWER |
| --- | --- |
| Opcode | 0x0050 |
| Direction | Messaging System → Remote Radio |
| Channel | Interconnect Channel |

| Offset | Field | Size | Description |
| --- | --- | --- | --- |
| 0 | Opcode | 2 | Value = 0x0050 |

Messages generated by the radio 160 include Outgoing Call (OUTCALL), Call Transfer (TRANSFER), Hello (HELLO), Goodbye (GOODBYE), Radio Answer (RADIO_ANSWER) and DTMF Tone (DTMF).

According to the exemplary embodiments, but in no way limiting variations of the exemplary embodiments, the message structure of the radio messages is as set forth in Tables F-K:

TABLE F

Outgoing Call

| Message | OUTCALL |
| --- | --- |
| Opcode | 0x0015 |
| Direction | Remote Radio → Messaging System |
| Channel | Control Channel |

TABLE F-continued

Outgoing Call

| Offset | Field | Size | Description |
|---|---|---|---|
| 0 | Opcode | 2 | Value = 0x0015 |
| 1 | Dialed Number Size | 1 | Specifies the number of dialed digits |
| 2 | Dialed Number | — | The number to be dialed |

TABLE G

Transfer-Call

| | |
|---|---|
| Message | TRANSFER |
| Opcode | 0x001A |
| Direction | Remote Radio → Messaging System |
| Channel | Control Channel |

| Offset | Field | Size | Description |
|---|---|---|---|
| 0 | Opcode | 2 | Value = 0x001A |
| 1 | Number Size | 1 | Specifies the number of dialed digits |
| 2 | Transfer Number | — | The number to transfer the caller to |

TABLE H

Hello

| | |
|---|---|
| Message | HELLO |
| Opcode | 0x0002 |
| Direction | Remote Radio → Messaging System |
| Channel | Interconnect Channel |

| Offset | Field | Size | Description |
|---|---|---|---|
| 0 | Opcode | 2 | Value = 0x0002 |

TABLE I

Goodbye

| | |
|---|---|
| Message | GOODBYE |
| Opcode | 0x0003 |
| Direction | Remote Radio → Messaging System |
| Channel | Signaling Channel |

| Offset | Field | Size | Description |
|---|---|---|---|
| 0 | Opcode | 2 | Value = 0x0002 |

TABLE J

Radio Answer

| | |
|---|---|
| Message | RADIO_ANSWER |
| Opcode | 0x0060 |
| Direction | Remote Radio → Messaging System |
| Channel | Interconnect Channel |

| Offset | Field | Size | Description |
|---|---|---|---|
| 0 | Opcode | 2 | Value = 0x0002 |

TABLE K

DTMF Tone

| | |
|---|---|
| Message | DTMF |
| Opcode | 0x0030 |
| Direction | Remote Radio → Messaging System |
| Channel | Interconnect Channel |

| Offset | Field | Size | Description |
|---|---|---|---|
| 0 | Opcode | 2 | Value = 0x0030 |
| 2 | DTMF ID | Variable | 0 through 9, * and # |

Messages generated by both the gateway 130 and radios 160 can include Hang Up (HUP) and Ping (PING), as follows:

TABLE L

Hang Up

| | |
|---|---|
| Message | HUP |
| Opcode | 0x0020 |
| Direction | Remote Radio → Messaging System |
| | Messaging System → Remote Radio |
| Channel | Interconnect Channel |

| Offset | Field | Size | Description |
|---|---|---|---|
| 0 | Opcode | 2 | Value = 0x0020 |
| 2 | Reason | 1 | Reason for hang up |

TABLE M

Ping

| | |
|---|---|
| Message | PING |
| Opcode | 0x0030 |
| Direction | Remote Radio → Messaging System |
| | Messaging System → Remote Radio |
| Channel | Interconnect Channel |

| Offset | Field | Size | Description |
|---|---|---|---|
| 0 | Opcode | 2 | Value = 0x0070 |
| 2 | Requesting ACK | 1 | 0x00 = No ACK needed |

In addition to signaling messages, the gateway 130 and radios 160 may also generate notification messages, such as Voice Mail Notification, Missed Call Notification and Do Not Disturb, exemplary formats of which are set forth in Tables N-P, as follows:

TABLE N

Voice Mail Notification

| | |
|---|---|
| Class | Status Notification |
| Message | Voice Mail Notification |
| Opcode | 0x0020 |
| Direction | Messaging System → Remote Radio |

| Offset | Field | Size | Description |
|---|---|---|---|
| 0 | Opcode | 2 | Value = 0x0020 |
| 2 | ID | 2 | Random Voice Mail ID |
| 4 | Date | 6 | Year, Month, Day |
| 10 | Time | 4 | Hour, Minute |
| 14 | Caller ID Name Size | 2 | |
| 16 | Caller ID Number Size | 2 | |
| 18 | Caller ID Name | — | |
| — | Caller ID Number | — | |

TABLE O

Missed Call Notification

| | | | |
|---|---|---|---|
| Class | Call Control | | |
| Message | Missed Call Notification | | |
| Opcode | 0x0022 | | |
| Direction | Messaging System → Remote Radio | | |

| Offset | Field | Size | Description |
|---|---|---|---|
| 0 | Opcode | 2 | Value = 0x0022 |
| 2 | Date | 6 | Year, Month, Day |
| 10 | Time | 4 | Hour, Minute |
| 14 | Caller ID Name Size | 2 | |
| 16 | Caller ID Number Size | 2 | |
| 18 | Caller ID Name | — | |
| — | Caller ID Number | — | |

TABLE P

Do Not Disturb

| | | | |
|---|---|---|---|
| Class | Status Notification | | |
| Message | Do Not Disturb Notification | | |
| Opcode | 0x0025 | | |
| Direction | Remote Radio → Messaging System | | |

| Offset | Field | Size | Description |
|---|---|---|---|
| 0 | Opcode | 2 | Value = 0x0025 |
| 2 | Function | 1 | 0x00—Disable DND (Let calls through) 0x01 = Enable DND (Block calls at the Core) |

Figure 5:
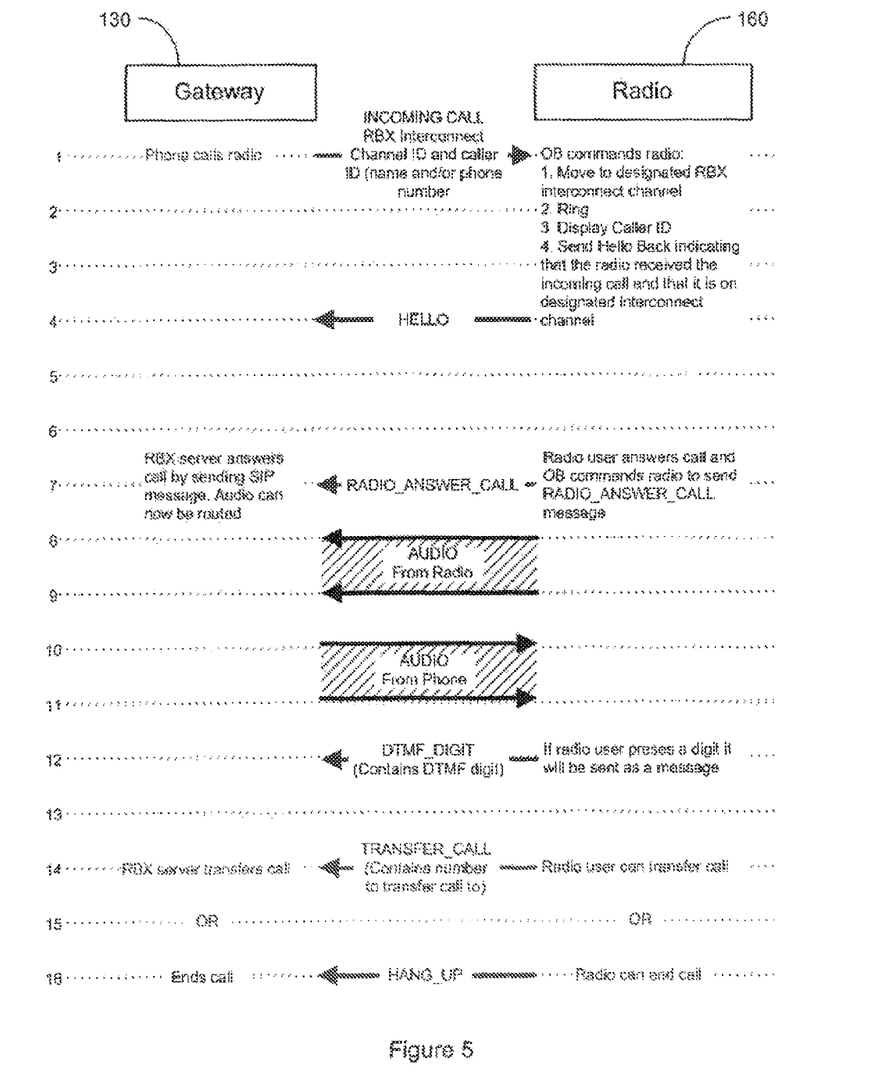
FIG. 5 is a message flow diagram showing an exemplary exchange of messages between the gateway 130 of FIG. 4 and a two-way radio 160 of FIGS. 1-3 for establishing an incoming call to the radio, according to the exemplary embodiments.
Figure 7:
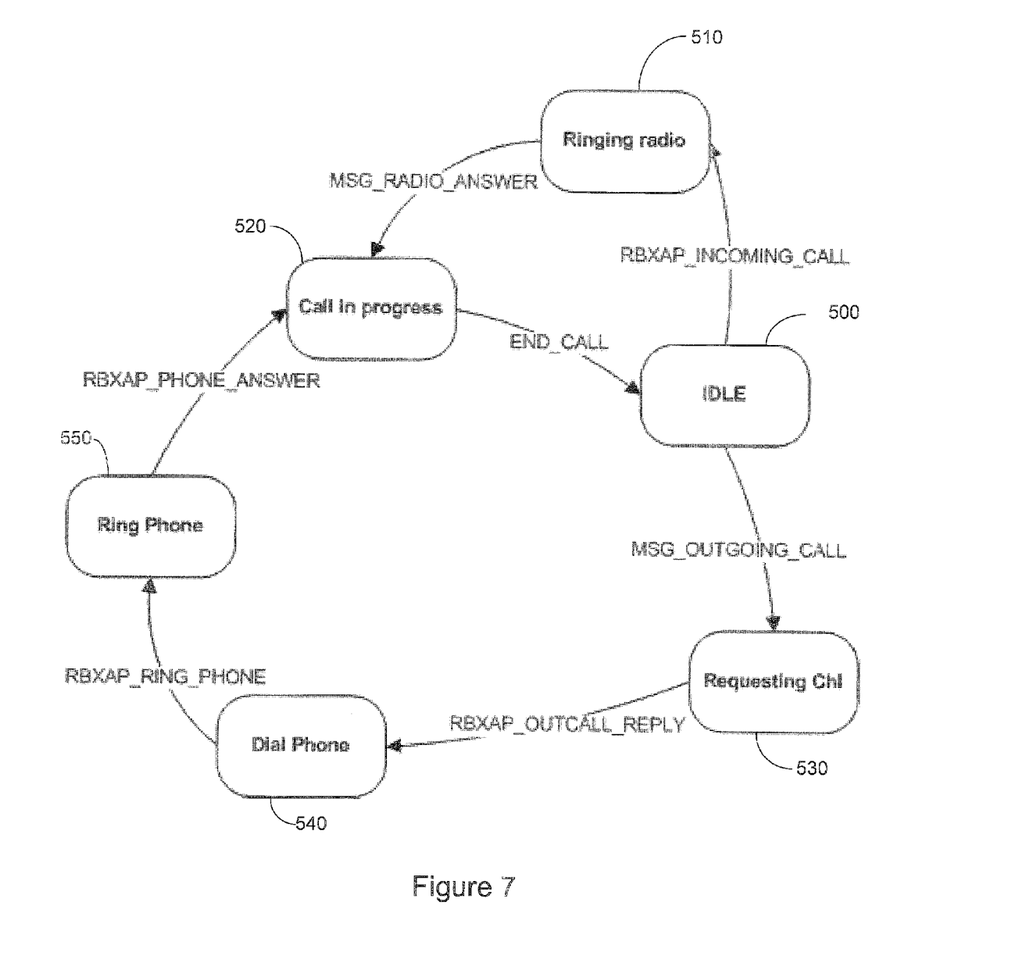
FIG. 7 is a state diagram showing call control states of a two-way radio, according to the exemplary embodiments.

Details of an exemplary exchange of messages between the gateway 130 and two-way radio 160 will now be described with reference to the message flow diagram of FIG. 5 and the state diagram of FIG. 7, for establishing an incoming call to the radio. Initially, the radio 160 is in an idle state 500. As discussed above, the PBX 100 sends a SIP INVITE message to the gateway 130 which, in response, checks to see which communication channels are in use and instructs a suitably determined control station to transmit an XCMP message with embedded Incoming Call Signaling message (INCALL) on the signaling frequency. The INCALL message includes, inter alia, channel ID and at least one of Caller ID and Caller Number, as discussed above with reference to Table A. Upon receipt of the INCALL message, the option board within radio 160 causes the radio to switch as necessary to the designated communication channel, generate a ringing signal (510), display the Caller ID and/or Caller Number and send a HELLO message back to the gateway 130 indicating that the radio 160 has received the incoming call and has switched to the designated channel.

Once the radio user answers the call, the radio 160 option board generates the RADIO_ANSWER message. The gateway 130 then sends a SIP message to PBX 100 (200 OK) in response to which a pair of RTP audio streams are established for the transmission and receive directions, between the remote phone caller and radio 160 (call in progress state 520).

The radio 160 option board provides the radio user the option to transfer the caller to another number at any time during the call. Upon invoking the transfer function the radio user is asked by the option board software to enter the number to transfer the call to. The radio 160 then switches as necessary to the receive frequency of a suitably determined control station and encapsulates the number to transfer to into a TRANSFER message transmitted on that frequency. The control station relays the TRANSFER message to the gateway 130, which relates the transfer request to the call that was in progress and sends appropriate SIP messages (e.g. a REFER message) to the PBX 100 which in response takes the necessary actions to transfer the call. The radio 160 returns to its idle state (500) as though it had hung up the call.

To end the call, the radio user presses an appropriate end call button on the radio 160 which, in response, generates a HANG_UP message to the gateway 130. The radio 160 returns to the idle state (500) and the gateway 130 sends an appropriate SIP message (e.g. BYE) to the PBX 100 for ending the call.

Figure 6:
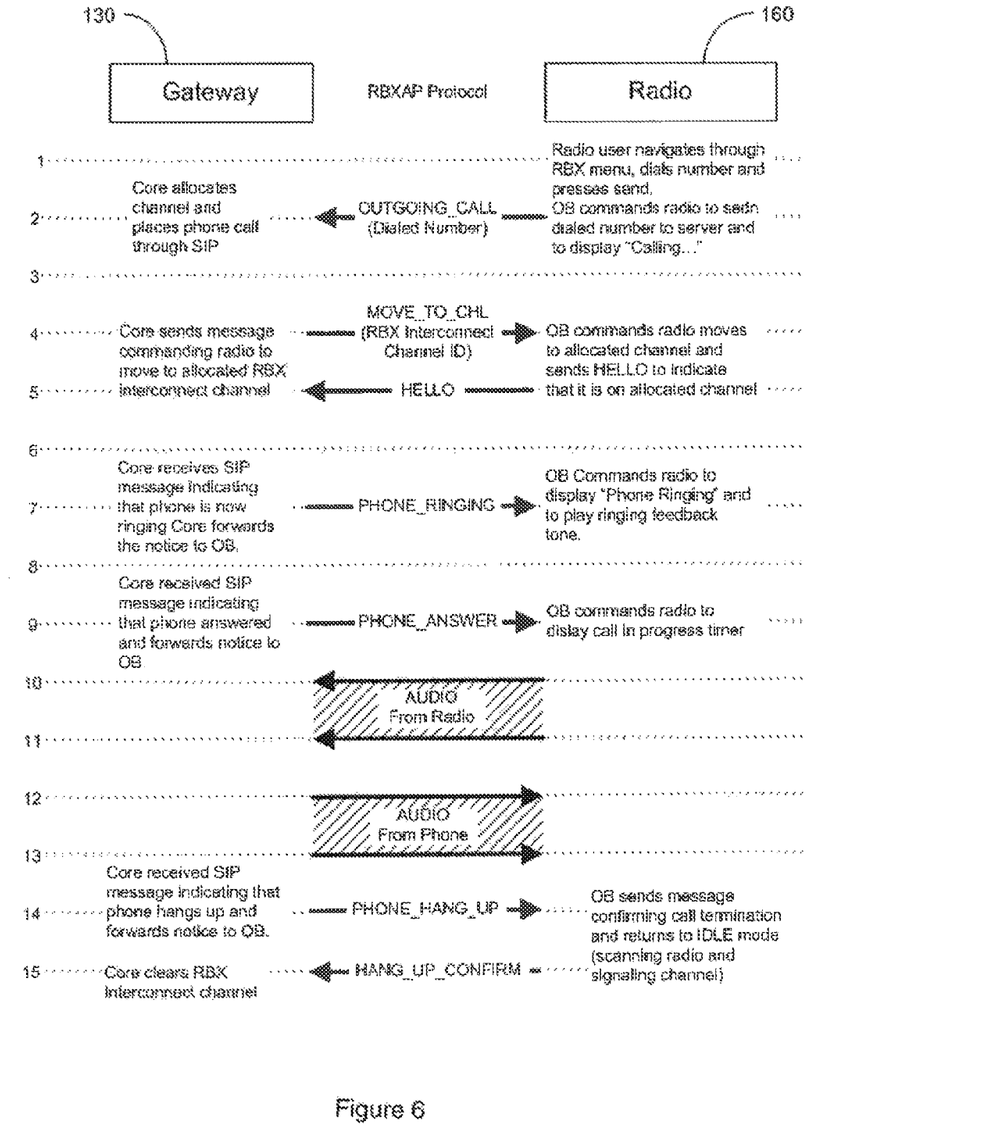
FIG. 6 is a message flow diagram showing an exemplary exchange of messages between the gateway 130 of FIG. 4 and a two-way radio 160 of FIGS. 1-3 for establishing an outgoing call from the radio, according to the exemplary embodiments.

Details of an exemplary exchange of messages between the gateway 130 and two-way radio 160 will now be described with reference to the message flow diagram of FIG. 6 and the state diagram of FIG. 7, for establishing an outgoing call from the radio. Initially, the radio 160 is in an idle state 500. The radio user navigates through a GUI menu to select the appropriate outgoing call option, dials the phone number of the intended party and presses a send button on radio 160. This results in radio 160 sending an XCMP message with embedded Outgoing Call message (OUTCALL) over the signaling channel to a suitably determined control station. The radio 160 enters a requesting-channel state (530). The OUTCALL message contains the telephone number of the called party. Control station 140 forwards this message on to gateway 130 which, in response and in accordance with its policies, searches for and reserves an available communication channel and sends via a suitably determined signaling control station an XCMP message with an embedded signaling message (OUTCALL_REPLY) addressed to the radio 160. Specifically, this reply message contains an indication of the grant of a communication channel for the call to take place on and, when a channel has been granted, also contains identification (the Channel ID) of that channel. Once the channel has been granted, the radio 160 changes as necessary from the frequency of the signaling control station to the frequency of the receiving station of communication channel that was identified by the Channel ID in the OUTCALL_REPLY message. The radio 160 sends an XCMP message on that frequency with an embedded signaling message (HELLO) to the receiving station of the assigned communication channel, and then changes as necessary to the frequency of the transmitting station of the assigned channel to await further signaling. The receiving station forwards the HELLO message on to the gateway 130 which, in response, encapsulates the telephone number of the called party from the original OUTCALL message into a SIP INVITE message to the PBX 100. Additional messaging occurs over the communication channel while the call is being established (e.g. HELLO, PHONE_RINGING (during which the radio 160 progresses from the dial phone state (540) to the ring phone state (550)), and PHONE_ANSWER (during which the radio 160 progresses from the ring phone state (550) to the call in progress state (520)), after which audio is exchanged over the assigned communication channel.

The remote caller can end the call by hanging up, in response to which PBX 100 sends a BYE message to the gateway 130 which, in response sends a HANG_UP message to radio 160. The radio 160 then sends a confirmation HANG_UP message and returns to the idle state (500).

Figure 8:
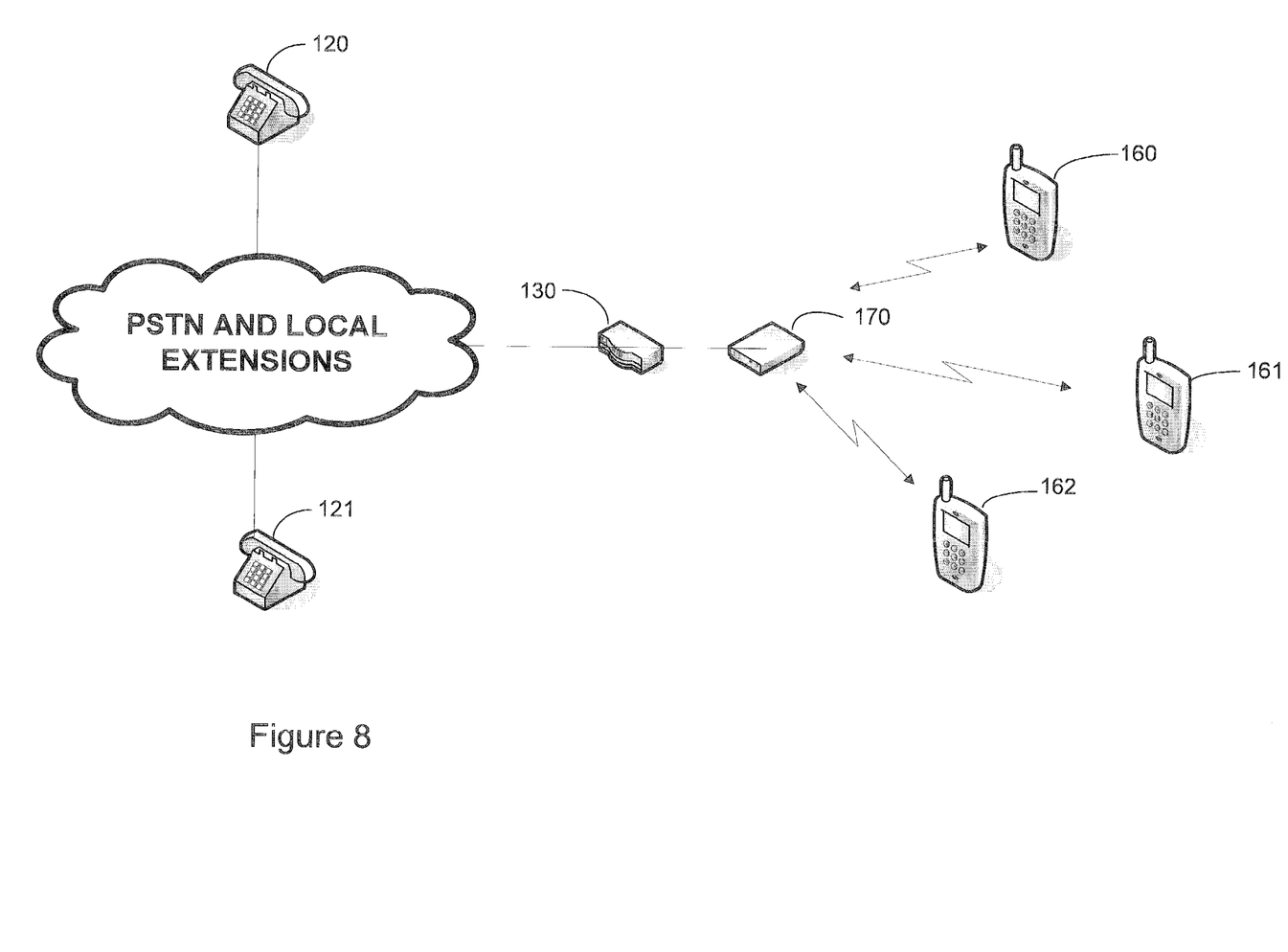
FIG. 8 shows, in block diagram form, an integrated digital two-way radio platform and IP PBX unified communication system, according to yet another alternate exemplary embodiment.

In yet further implementations and referring now to FIG. 8, phone 120 can call into gateway 130 to participate in a one-to-many group conversation with a plurality of radios 160-162 (radios 161 and 162 similar to radio 160 described above) all communicating on a common frequency. To initiate this mode of conversation, phone 120 dials a preset extension number on gateway 130 which represents the desired group of radios 160-162. Referring now also to FIG. 4, a call to this extension number coming in from the PBX 100 into the telephony platform 210 is directed to the dispatch handler 230, whereupon the dispatch handler 230 takes control of the call. Upon taking control, the dispatch handler 230 verifies that the dialed extension maps to the group of radios 160-162 (known to the system) and requests server 200 to reserve a communication channel for the call to take place on. If the dialed extension is invalid, or there are no free channels, the dispatch handler 230 disposes of the call itself. If a communication channel is successfully reserved, the dispatch handler 230 requests server 200 to reconfigure control station 170 to be able to communicate on the correct frequency which the group of radios 160-162 use to communicate with each other. Upon completion of the reconfiguration the dispatch handler 230 instructs the telephony platform 210 to connect audio pathways and begin passing audio transmissions back and forth between the Audio Module and the SIP Module of the telephony platform 210. The dispatch handler 230 similarly instructs telephony platform 210 to activate its VAD Module on the audio pathway of this connection, from which dispatch handler 230 receives information about the 'ebb and flow' of conversation with which it may, using server 200, apply radio discipline automatically on behalf of phone 120. Specifically, the VAD data may be used to activate and deactivate the push-to-talk function on the transmitting control station 170 based on when the phone 120 party speaks and stops speaking, respectively. Alternatively, the phone 120 party may elect to activate and deactivate the push-to-talk function on the transmitting control station 170 directly via pressing defined buttons on the keypad of phone 120.

Another phone 121 may dial the same preset extension number while phone 120 is already connected via gateway 130 with the group of radios 160-162 determined by the extension number. In this case, the dispatch handler 230 acquires control of the incoming call in the same manner as before and, determining that another phone 120 is already actively connected to the group of radios 160-162, instructs the telephony platform 210 to use its Conference Module to conference phone 121 into the existing connection between phone 120 and the group of radios 160-162. Thus a plurality of telephones 120-121, etc., may simultaneously participate in a many-to-many group conversation with a plurality of radios 160-162, etc.

During the process of connecting phone(s) 120, 121, etc., with a group of radios 160-162 the dispatch handler 230 provides audible notifications to the parties of key connection events. While control station 170 is being reconfigured, dispatch handler 230 causes a message to be played to the phone 120 party that an attempt to connect to the radio channel is being made. Upon the reconfiguration of control station 170 being completed, and thus of the connection being established, dispatch handler 230 causes a message to be played to the group of radios 160-162 that a phone user has joined the group, and simultaneously to any other phone which may already be connected that another phone user has joined the group, and simultaneously to phone 120 that it has now successfully joined the group.

For clarity, the gateway 130 is shown in FIG. 8 connected to a single interconnect control station 170. However, it is appreciated that in normal use gateway 130 can be connected to the control station 140 and multiple interconnect control stations 150-153, of FIG. 1, and/or to other configurations of control stations as depicted in FIGS. 2 and 3.

For clarity, the telephones 120-121 are shown in FIG. 8 connected to gateway 130 through a single PSTN and local PBX cloud. However, it will be appreciated that in other implementations a variety of local IP phones 110 and remote phones 120 will normally connect to gateway 130 through a PBX 100, as illustrated in FIG. 1.

According to another aspect, it is contemplated that firmware and system or user data on the option board of radio 160 be updated 'over the air'. Over the air programming may be initiated from a web interface in which one or more target radios 160 are selected to be updated with a new firmware version or with other data. When the reprogramming command is issued from the web interface the gateway 130 proceeds to broadcast RBXAP messages to the target radios 160 via a suitably determined control station.

Over the air programming consists of three phases. Using firmware update as an example (the process is essentially the same when system or user data are updated), first the gateway 130 sends a STATUS message to the radio 160. The option board in radio 160 responds with a STATUS_ACK message. This response identifies the current firmware version of the option board and contains a description of its current memory layout on a peripheral memory device such as but not limited to an EEPROM. The memory layout description identifies which memory sections are being used and which are not, and for each of those that are being used it further identifies for what purpose, and what the length of the section is.

If the firmware version indicated in the STATUS_ACK message does not concur with the latest option board firmware, then the gateway 130 proceeds to send the new firmware to the radio 160. The firmware is first compressed by the gateway 130 to minimize air traffic during the updating operation. The compressed firmware image is sent in small chunks encapsulated in SET messages, as set forth in greater detail below. SET messages contain the compressed software chunk, the destination memory address and the length of the chunk.

When the option board of radio 160 receives the SET message, it stores the compressed firmware chunk at the indicated memory address in its peripheral memory device and responds to the gateway 130 with a SET_ACK message, as set forth in greater detail below. The SET_ACK message contains the ID of the chunk that was just received and a result indicating that the chunk was successfully stored in the peripheral memory device.

When the SET_ACK message is received at the gateway 130 for the last chunk of firmware sent, the gateway 130 sends a REFLASH message to radio 160, as set forth in greater detail below. The REFLASH message contains the memory address where the new firmware should be installed in the option board. It also contains the total length and checksums of both the compressed and uncompressed firmware images. Lastly, it contains the version number of the new firmware.

When the option board of radio 160 receives the REFLASH message, it first confirms that the checksum of the compressed firmware image on the peripheral memory device is the same as that included in the REFLASH message. In the case of a match it proceeds to decompress the firmware image and to save it in the memory available to the option board, starting at the memory address indicated in the REFLASH message. Once this process is complete, the option board confirms that the checksum of the decompressed firmware image matches that contained in the REFLASH message. If it does, the option board returns a REFLASH_ACK message with a result of SUCCESS to the gateway 130. In the case that either checksum does not agree with those contained in the REFLASH message, the option board aborts the updating operation and returns a REFLASH_ACK message with a result of ERROR to the gateway 130. Once the firmware updating operation is finished the processor of the option board resets and begins running the new firmware. When only data and not firmware is being updated over the air, the option board of radio 160 does not reset.

Exemplary formats for the messages used to effect over the air programming of the option board, are set forth in the following tables:

TABLE Q

STATUS

| | Class | | Programmer |
|---|---|---|---|
| | Message | | Status |
| | Opcode | | 0x1000 |
| | Direction | | Programmer → User Radio |

| Offset | Field | Size | Description |
|---|---|---|---|
| 0 | Opcode | 2 | 0x1000 |
| 2 | Version | 1 | Version of the Programmer Software |

TABLE R

STATUS_ACK

| | Class | | Programmer |
|---|---|---|---|
| | Message | | Status ACK |
| | Opcode | | 0x1001 |
| | Direction | | User Radio → Programmer |

| Offset | Field | Size | Description |
|---|---|---|---|
| 0 | Opcode | 2 | 0x1001 |
| 2 | Version major | 2 | OB Firmware version |
| 4 | Version minor | 2 | OB Firmware version |
| 6 | Sections | 2 | Number of sections |
| 8 | Section information | | |

TABLE S

SECTION

| Offset | Field | Size | Description |
|---|---|---|---|
| 8 | Section Number | 2 | 1, 2, 3 |
| 10 | Section Type | 2 | 1 = contact list, 2 = system map, 3 = flash |
| 12 | Section Records | 1 | Number of records allowed in the section |
| 13 | Used Records | 1 | Used records in the section |
| 14 | Max records length | 1 | Max record length in bytes |
| 15 | Reserved records | 1 | First few records of the section may be reserved |
| 16 | Spare | | |

TABLE T

SET

| | Class | | Programmer |
|---|---|---|---|
| | Message | | SET |
| | Opcode | | 0x1002 |
| | Direction | | Programmer → User Radio |

| Offset | Field | Size | Description |
|---|---|---|---|
| 0 | Opcode | 2 | 0x1002 |
| 2 | Section Number | 1 | |
| 3 | Record Number | 2 | |
| 5 | Record Length | 2 | |
| 6 | Payload | Record length | |

The following table provides an example of a SET payload, although it should be noted that there is no specific format for the payload of a SET message. The payload content and its structure depend on the kind of data and purpose of the update. As an example payload, the following table illustrates a format used in the exemplary embodiment for transmitting updated information about the system's channel resources. This example in no way limits the amount of system channels or the kind of data that can be updated.

| 6 | Channel Type | 1 | Half duplex = 0, full duplex = 1 |
|---|---|---|---|
| 7 | Channel 1 Parameters | 15 | |
| 21 | Channel 2 Parameters | 15 | |

To continue this example, in the exemplary embodiment the channel parameter update information is formatted in the following manner:

| 0 | Mode | 1 | 0 = Repeater, 1 = Direct |
|---|---|---|---|
| 1 | Slot | 1 | 0 = inapplicable, 1 or 2 valid |
| 2 | CS IP address | 4 | Control Station IP address |
| 6 | Rx_Frequency | 4 | Hz/5 |
| 10 | Tx_Frequency | 4 | Hz/5 |
| 14 | Tx_power | 1 | 0 = low 1 = high |

TABLE U

SET_ACK

| | Class | | Programmer |
|---|---|---|---|
| | Message | | SET_ACK |
| | Opcode | | 0x1003 |
| | Direction | | User Radio → Programmer |

| Offset | Field | Size | Description |
|---|---|---|---|
| 0 | Opcode | 2 | 0x1003 |
| 2 | Section Number | 1 | |
| 4 | Record Number | 2 | |
| 5 | Result | 1 | 0 = Success 1 = Error |

TABLE V

REFLASH

| | Message | | REFLASH |
|---|---|---|---|
| | Opcode | | 0x1006 |
| | Direction | | Programmer → User Radio |

| Offset | Field | Size | Description |
|---|---|---|---|
| 0 | Opcode | 2 | 0x1006 |
| 2 | Load Address | 4 | 0xFFFFFFFF = I'm going to send you the compressed stuff ! 0xFFFFFFFF = Initiate reflash sequence |
| 6 | Binary Data Length | 4 | Binary data length |
| 10 | Binary Data Checksum | 2 | Binary Check sum |
| 12 | gzip_data_length | 4 | Compressed data length |
| 16 | gzip_data_checksum | 2 | Compressed data check sum |
| 18 | New_version_major | 1 | |
| 19 | New_version_minor | 1 | |
| 20 | extra | 1 | |

TABLE W

REFLASH_ACK

| Class | Programmer |
|---|---|
| Message | REFLASH_ACK |
| Opcode | 0x1007 |
| Direction | User Radio → Programmer |

| Offset | Field | Size | Description |
|---|---|---|---|
| 0 | Opcode | 2 | 0x1007 |
| 2 | Result | 1 | 0 = Success |
|  |  |  | 1 = Error |

According to another aspect of the exemplary embodiment, two-way radio hot desking may be provided for allowing a radio user to download personally specific information, such as but not limited to contact lists and radio settings, into any radio 160. A radio user authenticates with a username and password to the radio 160, which encapsulates the user name and password into a LOGIN message (see Table X, below) sent to the gateway 130. The gateway 130 verifies the authentication, and returns a LOGIN_REPLY (see Table Y, below) to the radio 160 indicating the success or failure of the login attempt. If authentication is validated, the gateway 130 then proceeds to send personally specific information of the authenticated radio user to the radio 160 using the "over the air programming" process. Upon successful authentication, the gateway 130 also associates the unique ID of the radio 160 to the extension number, routing options and permissions of the authenticated user.

TABLE X

LOGIN

| Message | LOGIN |
|---|---|
| Opcode | 0x1020 |
| Direction | User Radio → RBX server |

| Offset | Field | Size | Description |
|---|---|---|---|
| 0 | Opcode | 2 | 0x1020 |
| 2 | User name length | 2 |  |
| 4 | User name |  |  |
|  | Password length | 2 | Binary Check sum |
|  | Password |  |  |

TABLE Y

LOGIN_REPLY

| Message | LOGIN_REPLY |
|---|---|
| Opcode | 0x1021 |
| Direction | User Radio → Programmer |

| Offset | Field | Size | Description |
|---|---|---|---|
| 0 | Opcode | 2 | 0x1021 |
| 2 | Result | 1 | 0 = Success |
|  |  |  | 1 = Invalid Username or Password |

Certain adaptations and modifications of the described embodiments are possible. For example, although the exemplary embodiments establish communications between radio 160 and a remote phone caller/callee via a PBX, it is contemplated that other phone systems may be used in addition to or as an alternative to an IP PBX (e.g. one or more of digital PBX, peer-to-peer network-based call systems, PSTN, etc.). Also, it is contemplated that other two-way radio systems may be used in addition to or as an alternative to a Motorola MotoTRBO™ system. Also, although SIP is used in the exemplary embodiments, other session-based communication protocols (e.g. H.323 or as yet un-established protocols) may be used.

The above discussed embodiments are considered to be illustrative and not restrictive.

What is claimed is:

1. A system for establishing two-way calls between a radio one or more two-way push-to-talk radios and a packet-based private branch exchange, comprising:
    at least one control station operable to exchange messages with said one or more two-way push-to-talk radios over a radio frequency signaling channel and to establish audio communication with said one or more two-way push-to-talk radios over an assigned radio frequency communication channel corresponding to a channel frequency;
    a gateway operable to:
    (i) exchange packet communications including signaling messages with said packet-based private branch exchange,
    (ii) assign at least one communication channel to said one or more two-way push-to-talk radios in response to a call request from the packet-based private branch exchange or one or more of said two-way push-to-talk radios,
    (iii) convert between analog audio for sending to and receiving from said one or more two-way push-to-talk radios and digital audio packets recognized by said packet-based private branch exchange; and
    (iv) convert audio tones for activating special features of said packet-based private branch exchange; and
    said at least one control station being operable to forward a channel assignment message from said gateway to one or more of said two-way push-to-talk radios over said signaling channel to cause said one or more two-way push-to-talk radios to switch to at least one assigned communication channel to establish audio communication with said at least one control station over said at least one assigned communication channel, said at least one control station being further operable to transfer audio including audio tones for activating special features of said packet-based private branch exchange between said one or more two-way push-to-talk radios and said gateway.

2. The system of claim 1, wherein said special features are selected from the group comprising call transfer, conference, hot swap, lost call notification, voice mail notification, call routing according to GPS position and activating alarms, lights or devices.

3. The system of claim 1, wherein different channels are assigned to said one or more two-way push-to-talk radios for transmitting and receiving, respectively.

4. The system of claim 1, wherein said at least one control station comprises a signaling control station for exchanging signaling messages with said one or more two-way push-to-talk radios over a signaling channel and a plurality of interconnect control stations for establishing audio communication with said one or more two-way push-to-talk radios over an assigned channel.

5. The system of claim 4, wherein said signaling control station is enabled to exchange messages with at least one other of said interconnect control stations.

6. The system of claim 4, wherein said interconnect control stations are arranged in pairs to provide respective transmit and receive channels to said one or more two-way push-to-talk radios on different frequencies.

7. The system of claim 1, and further comprising a plurality of said control stations, each of which is operable to forward a channel assignment from said gateway to one or more of said radios and to transfer audio including audio tones for activating special features of said packet based private branch exchange between said one or more two-way push-to-talk radios and said gateway.

8. The system of claim 1, wherein said gateway is enabled to translate call control signals between a digital mobile radio protocol and packet based network protocols.

9. The system of claim 8, wherein said packet based network protocols comprise at least one of Session Initiation Protocol, Real-time Transport Protocol and Voice over Internet Protocol.

10. The system of claim 1, wherein said packet based private branch exchange is enabled for automated handling of radio discipline in said two-way call.

11. The system of claim 1, wherein said one or more two-way push-to-talk radios comprise an option board enabled to control operation of said one or more two-way push-to-talk radios and to provide enhanced call control.

12. The system of claim 11, wherein said option board is further enabled to inject synthesized tones into an audio transmission from said one or more two-way push-to-talk radios.

13. The system of claim 11, wherein said option board is reprogrammable over the air via said control station under control of said gateway.

14. The system of claim 1, wherein said communication channel comprises custom signaling protocols for addressing radio frequency communication reliability issues in using two-way radios for extended conversations with telephones.

15. The system of claim 1, wherein said at least one control station is further enabled to switch to transmit and receive frequencies of a group of two-way push-to-talk radios.

16. The system of claim 15, wherein said gateway is further enabled to establish a many-to-many call between said group of two-way push-to-talk radios and a packet based private branch exchange.

17. The system of claim 15, wherein said gateway is further enabled to provide audio notifications about key call set-up events to all call parties.

18. The system of claim 1, wherein said audio tones comprise dual-tone multi-frequency signals.

* * * * *